Aug. 11, 1959     R. GEWALT ET AL     2,899,266
METHOD FOR COLD STERILIZATION USING BACTERICIDAL GASES
Filed March 25, 1957     3 Sheets-Sheet 1

INVENTORS
RUDOLF GEWALT
& ERICH STEIN

BY *Connolly and Hutz*
THEIR ATTORNEYS

INVENTORS
RUDOLF GEWALT
& ERICH STEIN

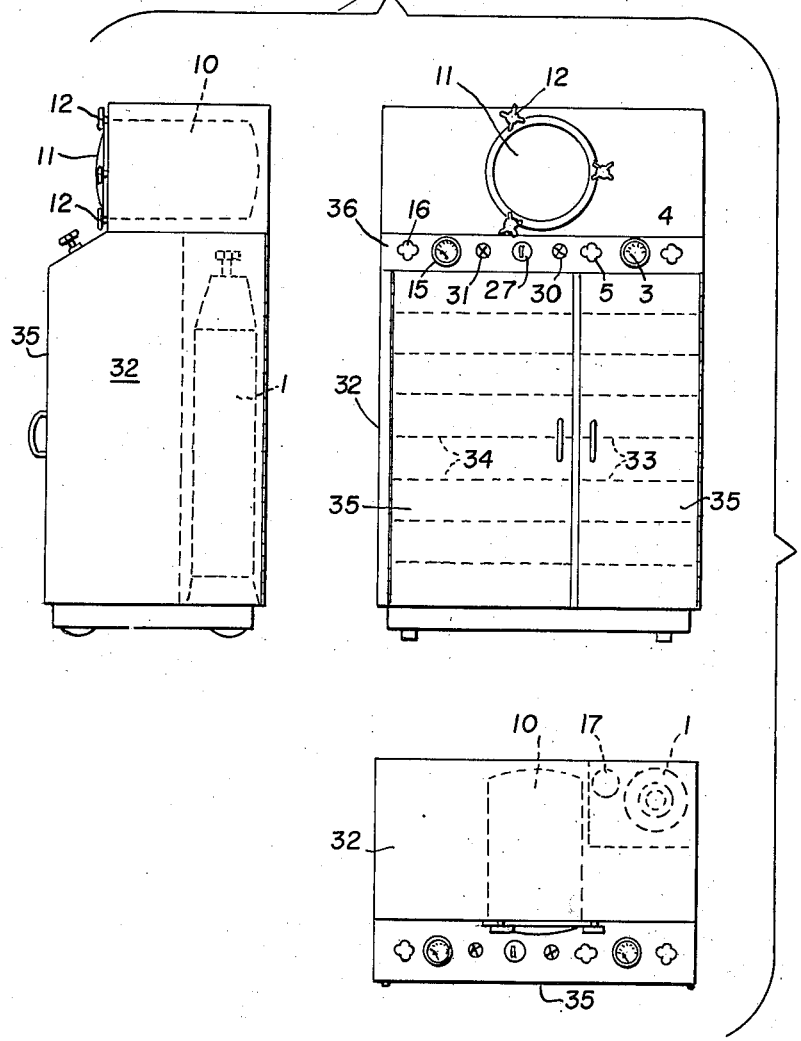

United States Patent Office 2,899,266
Patented Aug. 11, 1959

2,899,266

METHOD FOR COLD STERILIZATION USING BACTERICIDAL GASES

Rudolf Gewalt and Erich Stein, Weisbaden, Germany

Application March 25, 1957, Serial No. 648,407

Claims priority, application Germany March 26, 1956

4 Claims. (Cl. 21—58)

The invention relates to the cold sterilization with a bactericidal gas in a chamber in which objects to be sterilized, such as food and so forth, have been placed. The ability to sterilize these things depends upon the fact that the sterilizing gas is effective at a temperature below that required to denature protein, that is under 57° C.

Heretofore when sterilization with bactericidal gases was carried out in a closed system it was customary to use atmospheric pressure. The gas could be introduced from a supply of compressed liquefied gas, heated to convert some of the liquefied material to gaseous form.

It has also been suggested to carry out the above sterilization in a vacuum chamber. Even though vacuum allowed the gas to penetrate porous substances quickly, this method did not produce a greater bactericidal effect; this process required several hours since the concentration of the gas in a vacuum is necessarily small. Here various mixtures of ethylene oxide and carbon dioxide have been used in which the ethylene oxide or alkylene oxide is in a concentration of from 10 to 90%.

It is recommended, on the whole, that the alkylene oxide be used in mixtures which contain small amounts of alkylene oxide in order that the explosiveness be reduced. In any case it is necessary to eliminate the gas from the material being sterilized after the sterilization is completed because of its otherwise toxic effect. This elimination can be accomplished by the use of a suction pump. It has been found that the sterilizing effect of bactericidal gases such as alkylene oxide or alkylene imides, and so forth, in mixtures with indifferent gases like carbon dioxide and nitrogen can be markedly enhanced, and the time required for sterilization markedly reduced if the mixture is subjected to a superatmospheric pressure. A recommended pressure would be 3–6 atmospheres for inanimate objects and food-stuffs.

It has also been demonstrated that ethylene oxide-carbon dioxide mixtures are not dissolved in linear proportion to the pressure intracellularly, as they are ordinarily in fluids but rather under 3–6 atmospheres combine with the hydrogen in the protoplasm considerably more quickly.

As the result of this increased reactivity it is possible to kill all types of microorganisms more quickly than with other methods which use ethylene oxide concentrations of the same magnitude (measured in milligrams per liter for example) without pressure.

It is clear from the following table that distinctly better sterilization effect can be accomplished under elevated pressure even though the concentration of ethylene oxide is markedly reduced.

*Exposure times for spores on cotton with the same concentration but different pressures*

| Ethylene oxide concentration per liter | Pressure | | | |
|---|---|---|---|---|
| | atm., min. | 2 atm., min. | 4 atm., min. | 6 atm., min. |
| 200 mg./l | 300 | 220 | 185 | 105 |
| 400 mg./l | 200 | 180 | 140 | 70 |
| 600 mg./l | 140 | 125 | 95 | 28 |
| 800 mg./l | 60 | 50 | 40 | 12 |

Ethylene oxide-carbon dioxide mixtures of 1:25 can be used effectively. Since ethylene oxide represents the more expensive part of the mixture, this increase from 9 to 25 parts of carbon dioxide lowers the cost of the gas considerably and thereby the cost of the sterilization.

Another advantage of pressure is that the humidity within the pressure chamber is so reduced that even where relative humidity is concerned, optimal sterilization is accomplished. As a result of the reduction of the relative humidity to less than 50%, the sterilization of serum and other liquid substances of every sort can be accomplished quickly and with certainty.

It has been shown that the temperature in the pressure chamber should remain between 20° C. and 60° C. These temperatures are entirely sufficient for the removal of all infectious substances and are not harmful to temperature sensitive substances.

Metal, glass, synthetic substances, rubber, surgical instruments and so forth which till now have required long sterilization with steam at 120° C.–140° C. or dry heat at 180° C. can now be quickly sterilized without changing their fundamental cellular structure.

Foodstuffs and surgical instruments can even be wrapped in synthetic materials and quickly sterilized through these wrappings which eliminates the problem of reinfection which presents itself when these objects are wrapped after sterilization.

Spores were injected into clay which was then dried and wrapped in synthetic covering: subjected at a temperature of about 40° C. to a mixture of ethylene oxide-carbon dioxide, 1:12, under a pressure of 6 atm. for one hour. No spores grew in bouillon medium during a period of eight days. In a control experiment using pure ethylene oxide under negative pressure, even though the concentration was twice as great as in the elevated pressure experiments, no remarkable bactericidal effect through thin sheets of plastic was found. Thus it can be shown that by using pressures higher than atmospheric, quick sterilization through plastic coverings can be accomplished.

The present invention is illustrated by the accompanying drawings wherein:

Fig. 4 is the apparatus shown in front, side and plan views.

Objects such as surgical instruments or things such as gauze sponges, cotton, medicines in syringes prepared for injection which require sterilization and which might otherwise become contaminated after sterilization by the usual methods, lend themselves to this method.

In accordance with our experiments it has been shown that the ethylene oxide content after sterilization must be eliminated because of its toxicity. The cost of an apparatus for removing ethylene oxide after sterilization by suction would be too great especially where a small apparatus is concerned. Therefore the gas is directed into an absorption chamber which is constructed so as entirely to remove the ethylene oxide. For this purpose a calcium chloride solution is used in a container constructed so that the gas from the pressure chamber bubbles through the absorption solution. The chamber in which absorption takes place is constructed so as to create small bubbles and thereby produce the greatest possible absorption surface. The chemical reaction is rapid and the precipitate is alkylene chlorhydrine.

The gas mixture is ready for use in pressure cylinders and needs only to be attached to the pressure chamber.

It has been shown that it is best to introduce the gas mixture at the temperature at which the sterilization is expected to take place.

When as a result of expansion occurring as the liquified mixture reverts to the gaseous state, the temperature falls within the sterilization chamber, the sterilization effect is lost and the gases must be heated to the desired temperature.

Further, it has been shown that when the gas is cold it reacts principally with the hydrogen atom in the cell membrane. This means, that as a result of this chemical reaction irreversible changes occur which prevent optimal penetration later when the gas is warmed.

When the desired treatment takes place at a maximal temperature of 60° C. from the beginning in the pressure chamber, the reaction which prevents the penetration of the cell does not occur and the gas is able to penetrate the cell directly reacting with the hydrogen of the cell's protoplasm.

Therefore the apparatus is constructed so that the mixture, as it comes from the cylinder, is warmed to 60° C. before it enters the pressure chamber. Certain safety measures are taken to prevent an undesired rise in temperature or pressure. Also the gas, before it is allowed to escape from the pressure chamber, must pass through the absorption chamber in order to guarantee that it is no longer toxic. Clearly visible meters and safety devices are arranged for greatest safety on a panel.

Figure 2:
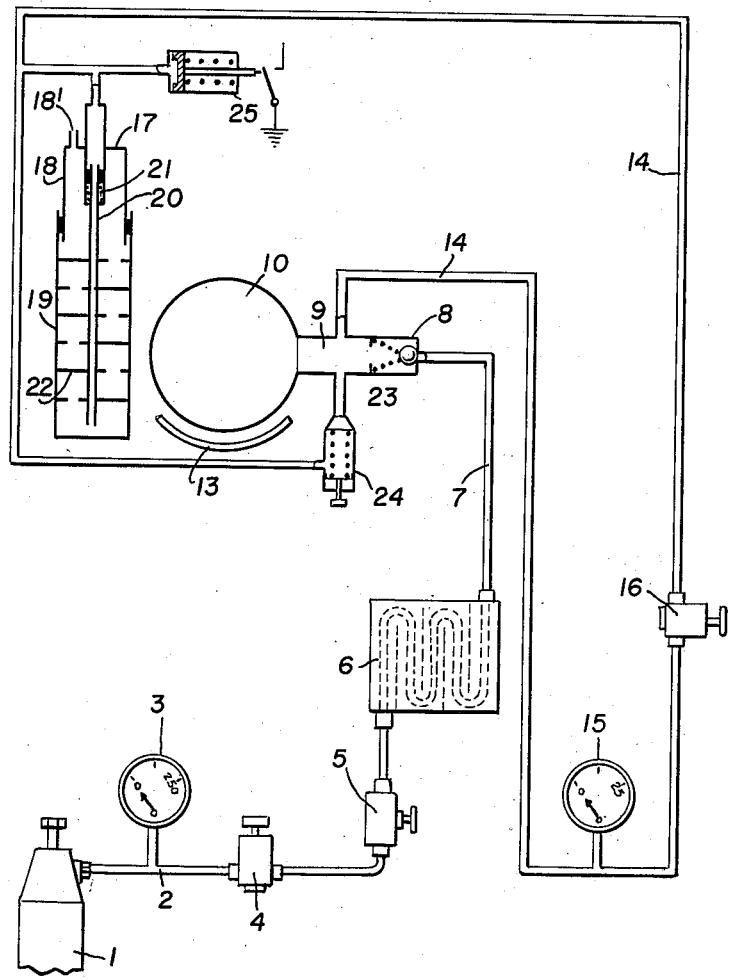
Fig. 2 shows the arrangement of the different parts of the testing apparatus of the present invention including the regulation and control devices and the pipe system.

As illustrated in Fig. 2 the steel cylinder 1, which contains the sterilization mixture under high pressure, is connected with the electrically heated gas pre-warmer 6 through the pipe 2, the pressure manometer 3 which indicates the pressure in the cylinder through a one-way valve 4, and finally, a reducing valve 5. From the gas pre-warmer 6 a tube 7 leads through a one-way valve 8 to a connecting piece 9 on the pressure chamber 10. The pressure chamber 10 has a hinged door 11 which can be made gas-tight by tightening three handles 12 which, when they are screwed down, press the door tightly to the body of the gas chamber (Fig. 4). The pressure chamber 10 has an electrical heating unit 13. Leading from the pressure chamber 10 there is a tube 14 by way of which the chamber can be emptied of gas. Attached to this tube 14 is a pressure manometer 15. The gas goes through a release valve 16 to the absorption chamber 17 with an opening 18 through which carbon dioxide can escape.

The absorption chamber 17 consists of an upper part 18 and a lower part 19 for the absorption solution. Both parts are gas-tight and connected with each other.

The absorption chamber 17 is connected to the pressure chamber by a connecting pipe 20 which is made gas-tight by a screw joint 21. The connecting pipe 20 has lead disks 22 which have openings allowing them to be assembled so that the gas can pass through them.

From connection 9 on pressure chamber 10 a pipe 23 goes to the absorption chamber 17. A safety valve 24 is built into this pipe.

Before pipes 14 and 23 attach to the absorption chamber 17, there is an electrical pressure indicator 25.

Figure 1:
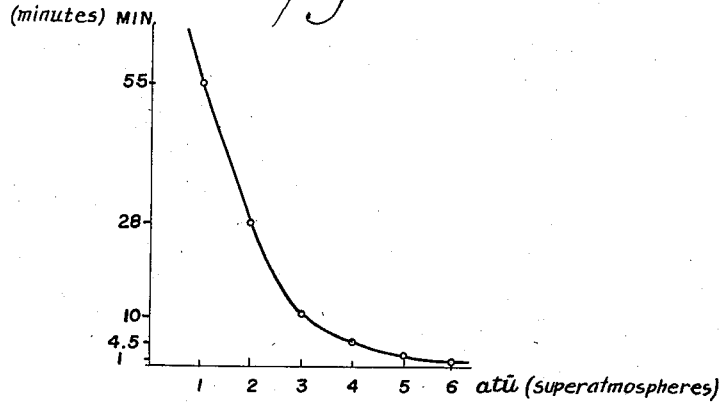
Fig. 1 is a time-pressure diagram of the ability of ethylene oxide to penetrate airtight coverings, liquids and cell membranes at different pressures.
Figure 3:
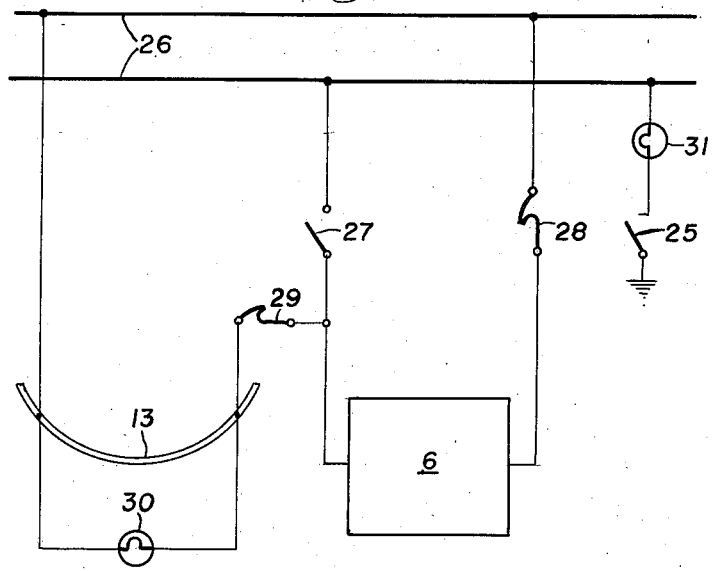
Fig. 3 is the electrical diagram for the above apparatus.

The apparatus is electrically connected and is also ground. The electrical supply from lines 26 (Fig. 3) passes through a central switch 27 to the gas pre-warmer 6 and is connected with a thermostat 28. The main switch 27 also connects the heating unit 13 of the pressure chamber in parallel with a control lamp 30. This line also carries a thermostat 29. The electrical pressure switch 25 regulates the current for a second control lamp 31.

As can be seen in Fig. 4 the equipment is housed in a cabinet 32 that is movable. In the upper part is the pressure chamber 10 as well as the connections with the electrical source. In the lower section the steel cylinder and the absorption chamber are built into a separate part of the cabinet. Another section of the lower part of the cabinet 32 contains drawers 33 and can be used for unsterilized objects. The rest of the space of the lower part of the cabinet contains drawers 34 where sterilized objects can be stored and can be reached through the door 35. In the lower section of the cabinet 32 are also the various devices for regulation and control arranged on a panel 36.

The apparatus is used in the following manner:

Those objects which are to be sterilized, which may be wrapped in plastic, are put into the pressure chamber 10 the door of which 11 is then screwed tight with the three handles 12 so that it is gas-tight. Before this the absorption chamber 17 is filled with the absorption material. Further the steel cylinder 1 is attached to the connecting tube and the valve on the steel cylinder 1 is opened. The pressure manometer 3 then indicates the pressure in the steel cylinder.

When the main switch 27 has been turned on, both the gas pre-warmer 6 and the heating unit in the pressure chamber 13 will have a current flowing through them. When the one-way valve 4 is opened, the gas flows through the reduction valve 5 and the gas pre-warmer 6; over the pipe 7; through the one-way valve 8; through the connection 9 into the pressure chamber 10. The thermostat 28 for the gas pre-warmer regulates the temperature of the gases which flow through it. The heating unit of the pressure chamber 10 is regulated through a second thermostat 29 which interrupts the current as soon as the pre-determined temperature in the pressure chamber 10 has been reached. Since the control lamp 30 is connected in parallel with the heating unit 13 of the pressure chamber 10 it shines as long as the heating unit is functioning.

The gas pressure is regulated by setting the reduction valve 5 at the desired pressure.

The safety valve 24 attached to the connection 9 prevents the developing of a dangerous pressure within the pressure chamber. Should the safety valve 24 open, the escaping gases must pass through the absorption chamber 17 where they are neutralised and rendered harmless.

The pressures developed within the pressure chamber 10 during sterilization can be read directly from a pressure manometer 15. In this way, the reduction valve 5 can be set so that the desired pressure is developed in the pressure chamber.

When the sterilization is finished, the electrical current is broken. The release valve 16 is now opened so that the warm gas passes from the pressure chamber into the absorption chamber. The pressure indicator 25 automatically lights the control lamp 31 so that from this it can be seen that the gas is passing from the pressure chamber to the absorption chamber.

As soon as the pressure in the pressure chamber returns to normal the control lamp 31 goes out since the connection at the pressure indicator has been broken. Now the pressure chamber can be opened.

The amount of fluid in the absorption chamber is just adequate for the neutralization of the contents of one steel cylinder of sterilizing gas. When the cylinder is replaced, the absorption chamber must be cleaned and refilled.

The described apparatus permits the carrying out of harmless sterilization of objects of all sorts with the use of a toxic gas which permits it to be done rapidly and inexpensively.

We claim:

1. In the method of sterilizing with bactericidal gases selected from the class consisting of alkylene oxides and alkylene imides, the improvement by which the sterilizing is carried out at a temperature of from about 20 to 60° C., under a pressure of from about 3 to 6 atmospheres, with a gas mixture in which the bactericidal gas is mixed with more than 9 and up to 25 parts of indifferent gas.

2. The combination of claim 1 in which the material being sterilized is prewrapped in sheets of synthetic plastic material.

3. The combination of claim 1 in which the sterilization is carried out in a pressure chamber, and at the end of the sterilization period the sterilizing gas mixture is released from the chamber through an absorption material before the pressure chamber is opened to cause the bactericidal gas to be absorbed and kept from free discharge into the atmosphere.

4. The combination of claim 3 in which the absorption material is an aqueous solution of calcium chloride.

References Cited in the file of this patent

UNITED STATES PATENTS

| | | |
|---|---|---|
| 2,037,439 | Schrader | Apr. 14, 1936 |
| 2,075,845 | Gross | Apr. 6, 1937 |
| 2,080,179 | Merriam | May 11, 1937 |
| 2,131,134 | Baer | Sept. 27, 1938 |
| 2,189,947 | Griffith | Feb. 13, 1940 |
| 2,490,344 | Fisher | Dec. 6, 1949 |
| 2,537,530 | Hofman | Jan. 9, 1951 |

OTHER REFERENCES

Phillips: American Jour. of Hygiene, vol. 50, 1949, pp. 270–279.